(12) United States Patent
Jiang (10) Patent No.: US 11,801,575 B2
(45) Date of Patent: Oct. 31, 2023

(54) METHOD FOR MANUFACTURING HIGH-TORQUE HEXAGONAL DRILL SHANK

(71) Applicant: JALOR INDUSTRY CO., LIMITED, Danyang (CN)

(72) Inventor: Ning Jiang, Danyang (CN)

(73) Assignee: JALOR INDUSTRY CO., LIMITED, Danyang (CN)

( * ) Notice: Subject to any disclaimer, the term of this patent is extended or adjusted under 35 U.S.C. 154(b) by 783 days.

(21) Appl. No.: 16/925,328

(22) Filed: Jul. 9, 2020

(65) Prior Publication Data

US 2021/0138545 A1  May 13, 2021

(30) Foreign Application Priority Data

Nov. 12, 2019  (CN) .......................... 201911100443.7

(51) Int. Cl.
  *B23P 15/32*  (2006.01)
  *B22F 3/10*  (2006.01)
  (Continued)

(52) U.S. Cl.
  CPC ................ *B23P 15/32* (2013.01); *B22F 1/10* (2022.01); *B22F 1/103* (2022.01); *B22F 3/1021* (2013.01);
  (Continued)

(58) Field of Classification Search
  CPC .... B22F 3/1017; B22F 3/1021; B22F 3/1025; B22F 3/225; B22F 5/00; B22F 5/08;
  (Continued)

(56) References Cited

U.S. PATENT DOCUMENTS

| | | | | |
|---|---|---|---|---|
| 1,543,608 A | * | 6/1925 | Leidecker | B21K 5/04 72/64 |
| 10,252,321 B2 | * | 4/2019 | Achleitner | B21H 3/10 |
| 11,305,347 B2 | * | 4/2022 | Sonoda | B23B 51/02 |
| 2011/0290079 A1 | * | 12/2011 | Schuetz | B23B 51/02 76/108.1 |

(Continued)

FOREIGN PATENT DOCUMENTS

| | | | |
|---|---|---|---|
| CN | 103433492 A | * | 12/2013 |
| CN | 103433492 A | | 12/2013 |

(Continued)

*Primary Examiner* — Adam J Eiseman
*Assistant Examiner* — Richard D Crosby, Jr.
(74) *Attorney, Agent, or Firm* — Bayramoglu Law Offices LLC (57) ABSTRACT

A method for manufacturing a high-torque hexagonal drill shank includes: firstly producing an air module, wherein the lower end of the air module is inserted into a molding cavity of a mold, a high-pressure air is injected into the air module, and the surface of the air module is provided with a plurality of air outlets; evenly mixing metal powder and an organic binder together; injecting obtained particulates in a heating-plasticizing state into the molding cavity by an injection molding machine to solidify and form a hexagonal drill shank blank; forming a non-cylindrical cavity inside the hexagonal drill shank blank under the action of the air module; removing the binder in the hexagonal drill shank blank by thermal decomposition; and, finally, obtaining a high-torque hexagonal drill shank by sintering and densifying.

10 Claims, 6 Drawing Sheets

(51) Int. Cl.
  *B22F 3/22* (2006.01)
  *B22F 5/00* (2006.01)
  *B22F 1/103* (2022.01)
  *B22F 1/10* (2022.01)
  *B22F 5/08* (2006.01)

(52) U.S. Cl.
  CPC ............... *B22F 3/225* (2013.01); *B22F 5/00* (2013.01); *B22F 5/085* (2013.01); *B22F 2005/002* (2013.01)

(58) Field of Classification Search
  CPC .... B22F 5/085; B22F 2005/002; B23P 15/32; B21K 5/10; B21K 5/00–10
  USPC ........................................................ 76/108.6
  See application file for complete search history.

(56) References Cited

U.S. PATENT DOCUMENTS

| | | | | |
|---|---|---|---|---|
| 2016/0074945 | A1* | 3/2016 | Achleitner | B23B 51/02 |
| | | | | 408/230 |
| 2018/0171721 | A1* | 6/2018 | Domani | B23P 15/32 |
| 2019/0351484 | A1* | 11/2019 | Yun | B33Y 70/10 |
| 2022/0152701 | A1* | 5/2022 | Ishimine | B30B 11/02 |

FOREIGN PATENT DOCUMENTS

| | | |
|---|---|---|
| CN | 104308163 A | 1/2015 |
| CN | 105268978 A | 1/2016 |
| CN | 108436075 A | 8/2018 |
| JP | 2003286506 A | 10/2003 |
| JP | 2004115898 A | 4/2004 |

* cited by examiner

METHOD FOR MANUFACTURING HIGH-TORQUE HEXAGONAL DRILL SHANK

CROSS REFERENCE TO THE RELATED APPLICATIONS

This application is based upon and claims priority to Chinese Patent Application No. 201911100443.7, filed on Nov. 12, 2019, the entire contents of which are incorporated herein by reference.

TECHNICAL FIELD

The present invention belongs to the technical field of electric tool auxiliary, and more particularly, to a method for manufacturing a high-torque hexagonal drill shank.

BACKGROUND

Impact drills are widely used in industries such as construction, decoration and furniture to punch and penetrate a workpiece. Such drills provide three times the torsion of the conventional drill. The impact drill is a screwing and drilling tool and may be battery-powered or powered by an alternating current power supply. Impact drills are typically designed to be hand-held and to punch and drill holes that are not especially large in diameter (≤6 mm), but placing the drill bit in the drill shank requires a high torque and a small run-out. Even if the micro drill bit is used to drill the hole, the hole is required to get through quickly, which puts forward high requirements for the internal structure of the drill shank.

Figure 5:
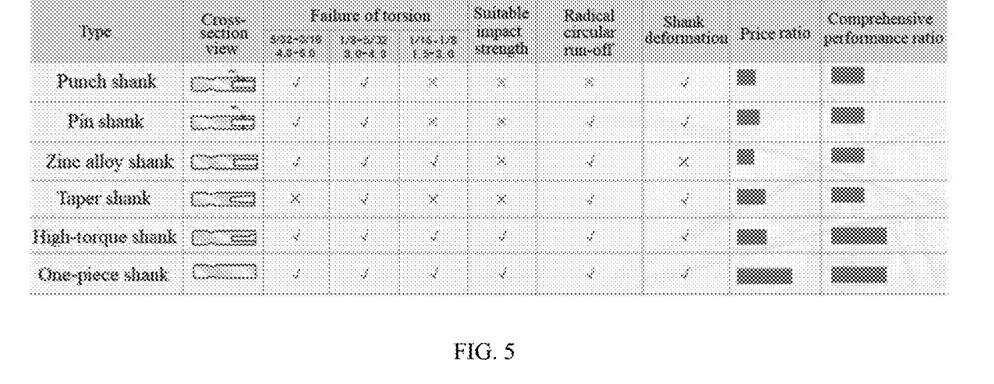
FIG. 5 is a schematic diagram showing the advantages and disadvantages of six types of drill shanks described in the background of the present invention.

There are generally six types of drill shanks, namely, punch shank, pin shank, zinc alloy shank, taper shank, high-torque shank and one-piece shank. As shown in FIG. 5, wherein the torsion, impact strength and radial circular run-out of the drill bit of less than 3 mm of the punch shank meet the standard. The torsion and impact strength of the pin shank, however, do not meet the standard. The zinc alloy shank is deformed and its impact strength does not meet the standard. The torsion and impact strength of the taper shank do not meet the standard. Only the performance of the high-torque shank and the one-piece shank meet the standard. The one-piece shank, however, is complicated to produce and requires 13-14 different processes, which has high cost and is difficult to ensure that the resulting shank is coaxial. Manufacturers do not typically produce it. Therefore, the high-torque shank is popular on the market. The interior of the high-torque shank is provided with a non-cylindrical cavity. The lateral side of the non-cylindrical cavity is provided with a plane, and the lateral side of the shank portion of the corresponding drill bit is also provided with a plane. The shank portion of the drill bit is inserted into the drill shank and rotates slowly, and when the two planes fit together, the installation is successful (there is an adhesive between them). Due to the tight fit of the two planes, the drill bit has a high torque and a high punching accuracy when the electric hand drill rotates.

In order to achieve the objective, the requirements of the drill shank are significant. The shank has to be strong to bear torsion forces delivered by the drive of the electric drill. It must be resilient and be capable of coaxial alignment with the drill chuck when installed for operation. The drill shank also requires low processing cost and easy operation. Therefore, it is desirable to study the high-torque shank.

SUMMARY

In order to solve the above-mentioned problems, the present invention provides a method for manufacturing a high-torque hexagonal drill shank, which is convenient to manufacture and has low processing cost. The manufactured high-torque drill shank meets the using requirement.

To achieve the objective, the present invention adopts the following technical solution.

A method for manufacturing a high-torque hexagonal drill shank includes the following steps:

(1) producing an air module, wherein the lower end of the air module is inserted into a molding cavity of a mold; an axis of the air module and the axis of the molding cavity are collinear; a high-pressure air of 150-180 bar is injected into the air module. The surface of the air module is provided with a plurality of air outlets;

(2) evenly mixing metal powder and an organic binder together;

(3) injecting obtained particulates in a heating-plasticizing state into the molding cavity by an injection molding machine to solidify to form a hexagonal drill shank blank, wherein an injection pressure is 140 bar;

(4) forming a non-cylindrical cavity inside the hexagonal drill shank blank under the action of the air module, wherein the non-cylindrical cavity is a groove structure similar to a blind hole; a foundation of the non-cylindrical cavity is still a cylinder, and one or more planes is provided on the lateral side of the cylinder;

(5) removing the binder in the hexagonal drill shank blank by thermal decomposition;

(6) performing surface processing and deburring; and (7) finally, obtaining a high-torque hexagonal drill shank by sintering and densifying, wherein a sintering temperature is 800-1200° C.

Figure 3:
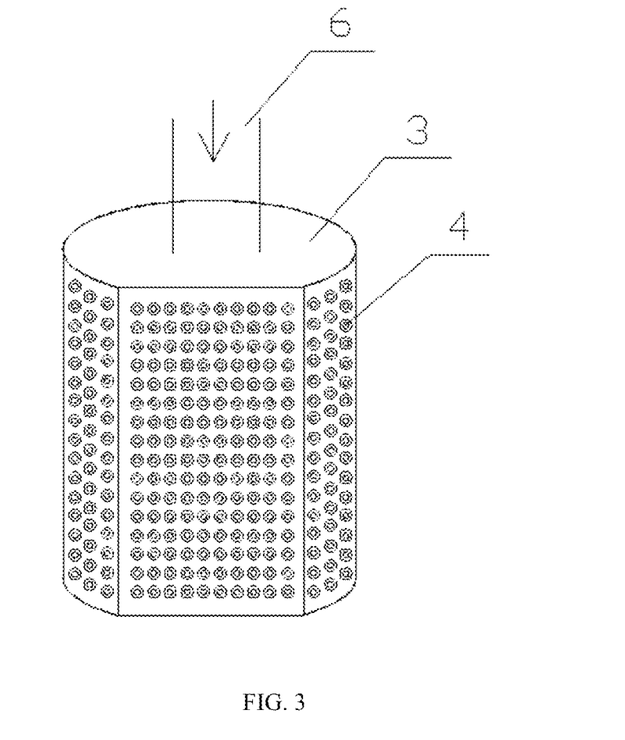
FIG. 3 is a schematic diagram showing the air module according to the present invention.

As an improvement to the present invention, in the step (1), the air module is a hollow tubular structure. The hollow tubular structure includes several types. As shown in FIG. 3, a side of one hollow tubular structure is a plane and a cross section of the hollow tubular structure is shaped as a bow. And the cross sections of the other types are shown in FIGS. 8A-8F.

As an improvement to the present invention, a diameter of the air module in the step (1) is 0.1-0.5 mm smaller than a diameter of the non-cylinder cavity in the step (4).

As an improvement to the present invention, in the step (1), the air outlet is tapered, and a radius of the outer end of the air outlet is larger than a radius of the inner end of the air outlet.

As an improvement to the present invention, in the step (1), a diameter of the lower portion of the air module is larger than a diameter of the upper portion of the air module, and the diameter of the lower portion of the air module minus the diameter of the upper portion of the air module does not exceed 0.1 mm.

As an improvement to the present invention, in the step (2), the metal powder is a metal compound or an elemental metal.

As an improvement to the present invention, in the step (2), a particle size of the metal powder is 2-15 μm.

As an improvement to the present invention, in the step (2), a component weight ratio of the organic binder is: sodium carboxymethyl cellulose: 60-80%, reinforcing agent: 9-20%, tackifier: 10-20%, preservative: 0.5-5%.

As an improvement to the present invention, in the step (3), a temperature of the plasticizing state is less than 150° C.

As an improvement to the present invention, in the step (5), a temperature of the thermal decomposition is 180-200° C.

The present invention has the following advantages.

(1) The air module is inserted into the molding cavity and the air is injected into the molding cavity through the air module, which is novel. When the internal pressure is greater than the injection pressure, a non-cylindrical cavity is formed in the drill shank blank.

(2) The ultrafine mental powder injection molding method is adopted. The high-torque hexagonal drill shank with high density, high precision and complex three-dimensional structure is quickly manufactured by sintering. The high-torque hexagonal drill shank has advantages of a low cutting volume, even material, good toughness, certain strength, good impact resistance and good mechanical performance.

(3) The sodium carboxymethyl cellulose is employed as the binder. Using less binder can make the metal powder to own better rheological property. The binder has no chemical reaction to the metal powder during the removal of the binder. The binder is easy to remove and there is no carbon remaining in the product.

(4) The method of the present invention only requires seven producing processes to manufacture the product, which is convenient and has low processing cost.

Figure 1:
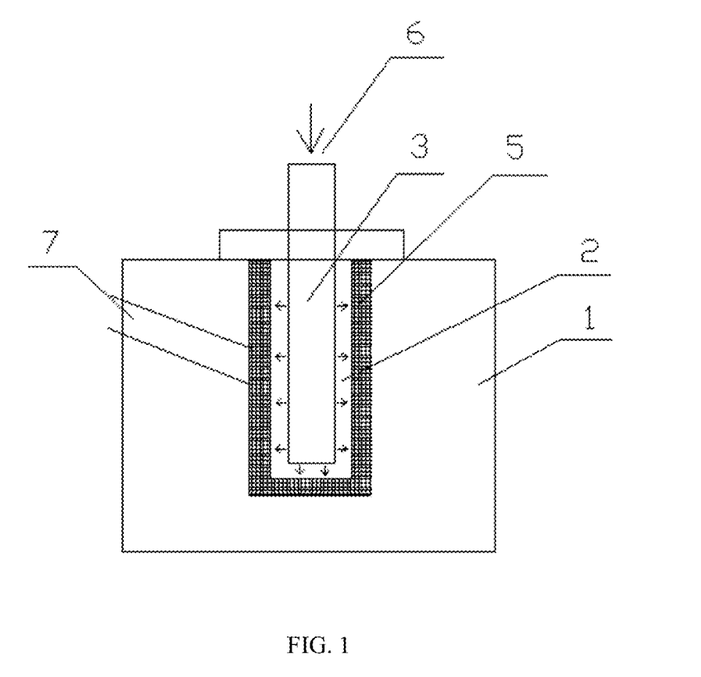
FIG. 1 is schematic diagram showing the structure of the present invention.

IN THE FIGURES 1. mold, 2. molding cavity, 3. air module, 4. air outlet, 5. drill shank blank, 6. air intake pipe, 7. injection port, 8. plane.

DETAILED DESCRIPTION OF THE EMBODIMENTS

The present invention is described further hereinafter in conjunction with embodiments and drawings. It should be understood that the embodiments are intended to describe the present invention, not to limit the scope of the present invention. It should be noted that the terms "front", "rear", "left", "right", "top" and "bottom" used in the following descriptions refer to the orientation in the drawings, and the terms "inside" and "outside" refer to the direction facing or away from the geometric center of a specific component, respectively.

As shown in the figures, the present invention provides a method for manufacturing a high-torque hexagonal drill shank. Based on the powder injection molding method, the air module is inserted into the molding cavity and the air is injected into the molding cavity through the air module. When the internal pressure is greater than the injection pressure, a stable space is formed outside the air module. Additionally, a non-cylindrical cavity is formed by molding in the drill shank blank. The new method provided by the present invention has fewer producing processes.

The present invention includes the following specific steps.

(1) An air module is produced, wherein the air module 3 is a hollow tubular structure. The lower end of the air module 3 is inserted into the molding cavity 2 of the mold. The axis of the air module 3 and the axis of the molding cavity 2 are collinear. The high-pressure air of 150-180 bar is injected into the air module 3 during the using process. The surface of the air module 3 is provided with a plurality of air outlets 4, as shown in FIG. 3.

(2) Metal powder and an organic binder are evenly mixed together.

Metal compound or elemental metal can be used as materials of the metal powder, and the metal compound or elemental metal can be powder. In the case of metal compound, the metal powder is obtained by electrolysis, thermal decomposition, thermal reduction decomposition or other methods. In the case of elemental metal, after the elemental metal is melted at high temperature, is ejected under high pressure and is cooled rapidly, the metal powder is obtained.

The size of the metal powder in the traditional powder injection molding method is larger than 40 μm. The size of the metal powder in the present invention is controlled from 0.5 to 20 μm. When the size of the particulate decreases, the specific surface area of the particulate increases, which is easier to form and sinter.

The organic binder is used to bind metal powder particles, so that the mixed materials are heated in the charging barrel of the injection molding machine according to their rheological and lubricating properties. The presence of the binder ensures even distribution of the powder, thus eliminating the unevenness in the micro tissue of the blank and enabling the density of the sintered product to reach theoretical density of the material. Therefore, the selection of the binder is a key to the powder injection molding. The requirements of the organic binder are as follows: using less binder can make the metal powder express its own more desirable rheological properties; the binder has no chemical reaction to the metal powder during the removal of the binder; and the binder is easy to remove and there is no carbon remaining in the product. The component weight ratio of the organic binder adopted by the present invention is: sodium carboxymethyl cellulose: 60-80%, reinforcing agent: 9-20%, tackifier: 10-20%, preservative: 0.5-5%, which can meet the aforementioned requirements.

(3) The obtained particulates in a heating-plasticizing state (less than 150° C.) are injected into the molding cavity by the injection molding machine to solidify and form a hexagonal drill shank blank, wherein an injection pressure is 140 bar and the injection pressure is less than the pressure of the high-pressure air in the air module 3. 140 bar is equal to 14000000 Pascal.

(4) While injecting a mixture of the metal powder and the organic binder, a high-pressure air is injected into the air module 3 via the air intake pipe 6. The high-pressure air is ejected from the plurality of air outlets 4, which are arranged on the outside and bottom of the air module 3, to form a non-cylindrical cavity inside the drill shank blank. The non-cylindrical cavity and the air module 3 have the same rotational speed and have different sizes. The size of the non-cylindrical cavity is 0.1-0.5 mm larger than that of the air module 3.

The outside shape of the hexagonal drill shank blank in the present invention is a hexagon, and the non-cylindrical cavity is arranged inside the hexagonal drill shank blank. The outside width of the hexagonal drill shank blank is 5-10 mm, which matches with the chuck of the electric hand drill in the prior art. The internal aperture of the non-cylindrical cavity is not more than 6 mm. And the lateral side of the non-cylindrical cavity is provided with 1-4 planes 8, which are used for assembling and torque transfer.

Figure 2:
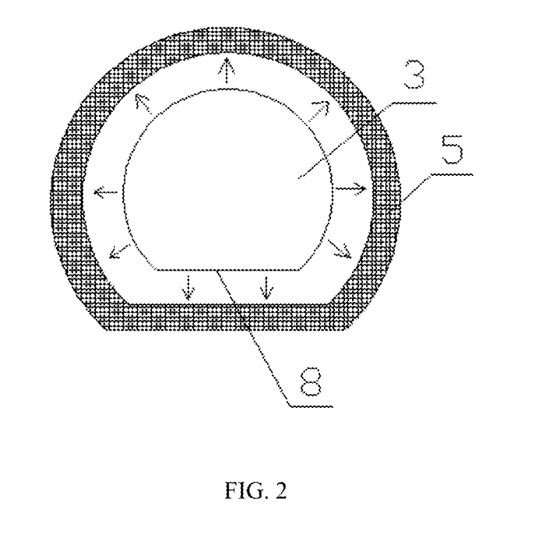
FIG. 2 is an overhead view showing the air module being inserted into the molding cavity according to the present invention.

The high-pressure air of 150 bar is injected into the air module 3 of the present invention, and the powder mixture of 140 bar is arranged at the outside of the air module 3. The high-pressure air ejected from the air outlets 4 forms a space of 0.1 mm outside the air module 3. If the high-pressure air of 180 bar is injected into the air module 3, the high-pressure air ejected from the air outlets 4 forms a 0.5 mm space outside the air module 3. That is, the air module 3 and the pressure of the high-pressure air inside the air module 3 together determine the aperture inside the drill shank, as shown in FIGS. 1-2.

Figure 4:
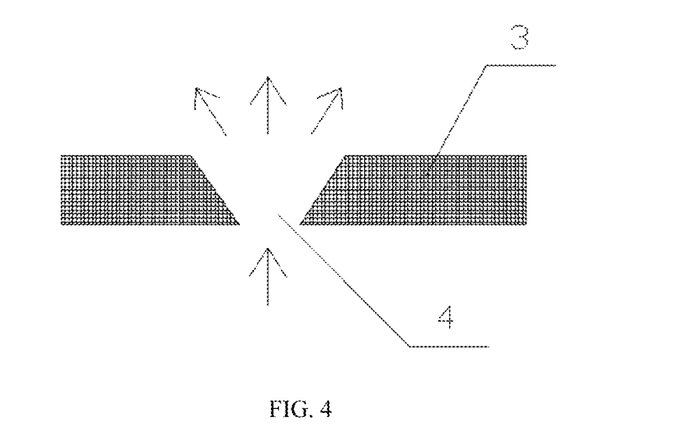
FIG. 4 is a schematic diagram showing the air outlets according to the present invention.

In order to ensure that the high-pressure air ejected from the air outlets 4 can cover the outside of the entire air module 3 and to ensure even pressure of the high-pressure air, according to the present invention, the air outlet is tapered, and a radius of the outer end of the air outlet is larger than a radius of the inner end of the air outlet, as shown in FIG. 4. This ensures the even pressure of the air curtain.

During the process of ejecting the air, the air module 3 has a specific length. Although the length of the air module 3 is short, the pressure of the air flow is reduced when the air flow passes through the interior of the air module 3. In order to prevent reduction of the pressure of the air flow, according to the present invention, a diameter of the lower portion of the air module 3 is larger than a diameter of the upper portion of the air module 3, and the diameter of the lower portion of the air module 3 minus the diameter of the upper portion of the air module 3 does not exceed 0.1 mm. This compensates for the air pressure change resulting from the pressure reduction, which ensures that the high-pressure air ejected from the air outlet 4 creates the same size of space outside the air module 3 and ensures accuracy.

(5) The binder in the drill shank blank must be removed before the drill shank blank is sintered, and the strength of the blank cannot be reduced. According to the present invention, the binder in the hexagonal drill shank blank is removed by thermal decomposition at 180-200° C.

(6) Surface processing and deburring are performed.

Figure 9:
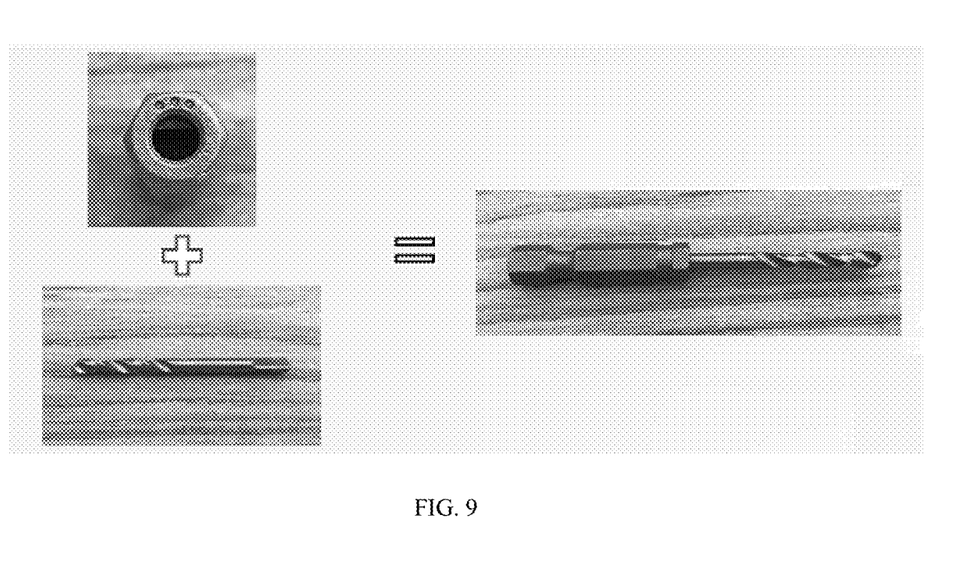
FIG. 9 is a schematic diagram showing the assembly of the drill shank and the drill bit.

(7) Finally, as shown in FIG. 9, a high-torque hexagonal drill shank is obtained by sintering and densifying.

As shown in FIGS. 8A-8F, the non-cylindrical cavity inside the manufactured hexagonal drill shank accommodates a bow-faced drill shank (one plane), a two-sided milling drill shank or a three-sided milling drill shank. The plane of the two-sided milling drill shank can be symmetrical or asymmetric.

Figure 6:
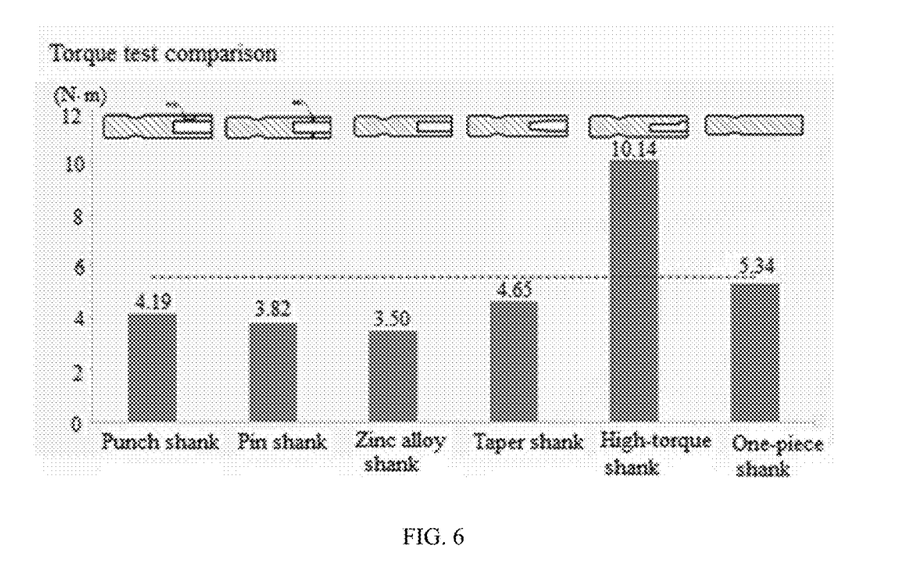
FIG. 6 is a schematic diagram showing the comparison of the torque tests of six types of drill shanks.
Figure 7:
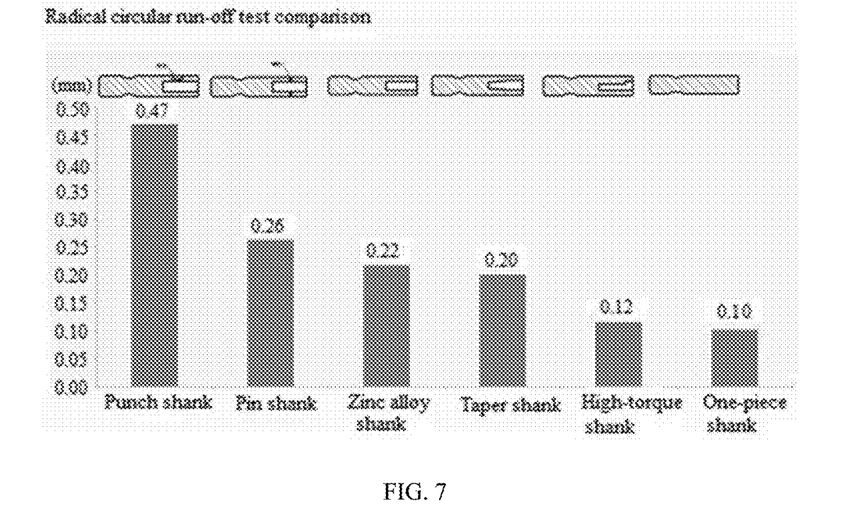
FIG. 7 is a schematic diagram showing the comparison of the radical circular run-off tests of six types of drill shanks.
Figure 8A:
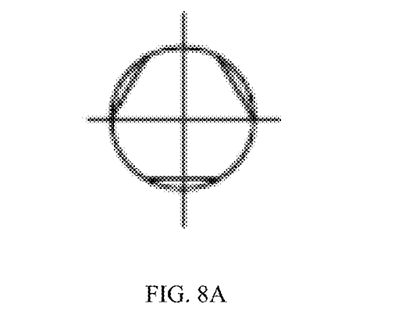
FIGS. 8A-8F are cross-sectional views of several air modules.
Figure 8B:
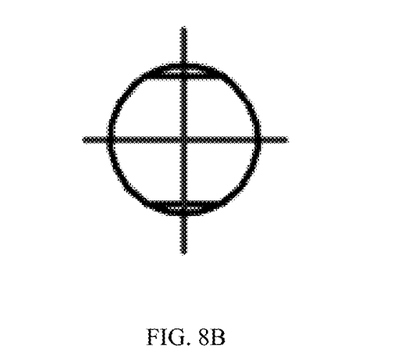
Figure 8C:
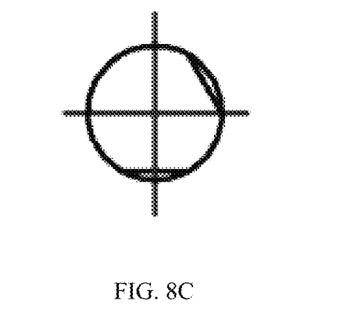
Figure 8D:
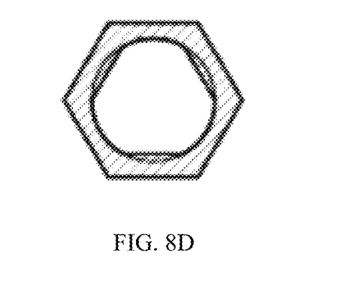
Figure 8E:
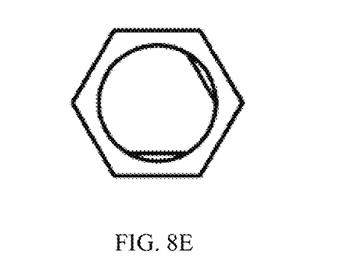
Figure 8F:
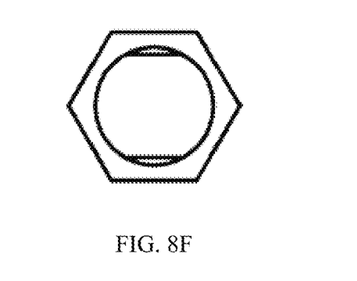

Based on the mental powder injection molding method, according to the present invention, the air module is inserted into the molding cavity and the air is injected into the molding cavity through the air module. When the internal pressure is greater than the injection pressure, a non-cylindrical cavity is formed in the drill shank blank. The high-torque hexagonal drill shank with high density, high precision and complex three-dimensional structure is quickly manufactured by sintering. The high-torque hexagonal drill shank has the advantages of a low cutting volume, even material, good toughness, certain strength, good impact resistance, good mechanical performance, fewer processes for producing and a low processing cost. As shown in FIGS. 6-7, compared with other shanks' torsion and radial circular run-out test data, the high-torque hexagonal drill shank has superior mechanical performance and lower cost. Therefore, the method of the present invention is novel, convenient for production and worth popularizing.

The technical solutions disclosed by the present invention are not limited to solution of the above-mentioned embodiments, but also include any technical solution combined by the above-mentioned technical features.

What is claimed is:

1. A method for manufacturing a high-torque hexagonal drill shank, comprising the following steps:
    (1) producing an air module, wherein a lower end of the air module is inserted into a molding cavity of a mold, an axis of the air module and an axis of the molding cavity are collinear, a high-pressure air of 150-180 bar is injected into the air module, and a surface of the air module is provided with a plurality of air outlets;
    (2) evenly mixing metal powder and an organic binder together to obtain particulates;
    (3) injecting the particulates in a heating-plasticizing state into the molding cavity by an injection molding machine to solidify to form a hexagonal drill shank blank, wherein an injection pressure is 140 bar;
    (4) forming a non-cylindrical cavity inside the hexagonal drill shank blank under an action of the air module, wherein a plane is arranged on a lateral side of the non-cylindrical cavity;
    (5) removing the organic binder in the hexagonal drill shank blank by thermal decomposition;
    (6) performing surface processing and deburring on the hexagonal drill shank blank; and
    (7) obtaining a high-torque hexagonal drill shank by sintering and densifying the hexagonal drill shank blank.

2. The method for manufacturing the high-torque hexagonal drill shank according to claim 1, wherein, in the step (1), the air module is matched with an interior of the non-cylindrical cavity.

3. The method for manufacturing the high-torque hexagonal drill shank according to claim 1, wherein, a diameter of the air module in the step (1) is 0.1-0.5 mm smaller than a diameter of the non-cylinder cavity in the step (4).

4. The method for manufacturing the high-torque hexagonal drill shank according to claim 1, wherein, in the step (1), each air outlet of the plurality of air outlets is tapered, and a radius of an outer end of the each air outlet is larger than a radius of an inner end of the each air outlet.

5. The method for manufacturing the high-torque hexagonal drill shank according to claim 1, wherein, in the step (1), a diameter of a lower portion of the air module is larger than a diameter of an upper portion of the air module, and the diameter of the lower portion of the air module minus the diameter of the upper portion of the air module does not exceed 0.1 mm.

6. The method for manufacturing the high-torque hexagonal drill shank according to claim 1, wherein, in the step (2), the metal powder is a metal compound or an elemental metal.

7. The method for manufacturing the high-torque hexagonal drill shank according to claim 1, wherein, in the step (2), a particle size of the metal powder is 2-15 μm.

8. The method for manufacturing the high-torque hexagonal drill shank according to claim 1, wherein, in the step (2), a component weight ratio of the organic binder is:
60-80% of sodium carboxymethyl cellulose,
9-20% of reinforcing agent,
10-20% of tackifier, and
0.5-5% of preservative.

9. The method for manufacturing the high-torque hexagonal drill shank according to claim 1, wherein, in the step (3), a temperature of the heating-plasticizing state is less than 150° C.

10. The method for manufacturing the high-torque hexagonal drill shank according to claim 1, wherein, in the step (5), a temperature of the thermal decomposition is 180-200° C.

* * * * *